United States Patent
Urushidani et al.

(10) Patent No.: US 6,690,301 B2
(45) Date of Patent: Feb. 10, 2004

(54) VEHICLE WITH POSITION DETECTOR

(75) Inventors: Shinzo Urushidani, Saitama (JP); Shunji Yano, Saitama (JP); Kanji Ichino, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 93 days.

(21) Appl. No.: 10/002,120

(22) Filed: Dec. 5, 2001

(65) Prior Publication Data

US 2002/0067293 A1 Jun. 6, 2002

(30) Foreign Application Priority Data

Dec. 5, 2000 (JP) .......................................... 2000-369883

(51) Int. Cl.[7] .............................................. G08G 1/123
(52) U.S. Cl. ....................... 340/988; 340/989; 340/990; 340/991
(58) Field of Search ................................ 340/988, 989, 340/990, 991, 992, 995.1, 995.17, 433, 693.1, 693.2, 693.4; 701/1, 32, 207, 213; 455/572, 573, 574

(56) References Cited

U.S. PATENT DOCUMENTS

| | | | | | |
|---|---|---|---|---|---|
| 4,807,127 A | * | 2/1989 | Tenmoku et al. | ........... | 340/988 |
| 4,926,161 A | * | 5/1990 | Cupp | ........................ | 340/572.1 |
| 5,524,081 A | * | 6/1996 | Paul | ........................... | 701/300 |
| 5,754,125 A | * | 5/1998 | Pearce | ........................ | 340/989 |
| 5,796,365 A | * | 8/1998 | Lewis | ........................ | 342/357 |
| 5,826,675 A | * | 10/1998 | Yamamoto | .................... | 180/220 |
| 5,844,473 A | * | 12/1998 | Kaman | ........................ | 340/439 |

FOREIGN PATENT DOCUMENTS

JP          A2000-142514          5/2000

* cited by examiner

*Primary Examiner*—Toan N Pham
(74) *Attorney, Agent, or Firm*—Birch, Stewart, Kolasch & Birch, LLP

(57) ABSTRACT

The position of a vehicle is to be detected accurately while suppressing the consumption of a battery. In accordance with instructions given from a position detection service center a base station issues requests at certain intervals. A vehicle V, upon receipt of a request, issues an answer signal containing ID information. On the basis of the answer signal the position detection service center decides the position of the vehicle V and offers the position information to a control center on demand. Electric power is supplied from a vehicular battery to an answer signal issuing member installed in the vehicle V. Even after a main power supply switch is turned OFF, the supply of electric power from the battery is continued, thus permitting an answer to a request from the base station. Consequently, the control center can determine a vehicular stop position accurately.

12 Claims, 5 Drawing Sheets

VEHICLE WITH POSITION DETECTOR

CROSS-REFERENCE TO RELATED APPLICATIONS

The present application claims priority under 35 USC 119 to Japanese Patent Application No. 2000-369883 filed on Dec. 5, 2000 the entire contents thereof is hereby incorporated by reference.

BACKGROUND OF THE INVENTION

1. Field of the Invention

The present invention relates to a vehicle with a position detector and more particularly to a vehicle with a position detector having a radio communication means for informing a supervisor of the position of the vehicle.

2. Description of Background Art

Systems are known for renting vehicles such as bicycles and motor-assisted bicycles. For example, in Japanese Patent Laid Open No. 142514/2000 there is described a rental system wherein an ID card issued by a central control unit is used for unlocking a motor-assisted bicycle or for replacing a battery.

In the above vehicle rental system, if a supervisor can detect positional information on rental vehicles, it will be useful in the operation of the rental system, including maintenance of the vehicles and accounting.

The use of a radio communication means may be effective for information relating to the positioning of a vehicle. In this case, however, the power consumption of the communication device used may become large, depending on the condition of radio wave. Therefore, it is necessary to avoid wasteful power consumption, or else the consumption of the battery as a power supply will be large. From this standpoint it is preferable that the transmission and reception of radio waves should be intermittent, not constant, or the power should be turned OFF when the vehicle concerned is stopped.

In the case of performing the transmission and reception of the radio waves intermittently, a vehicular stop position may be unable to be detected accurately at a certain difference between a power-OFF timing during vehicular stop and a position detecting timing by intermittent transmission and reception of radio wave. Therefore, it is desired to develop a system which can make an accurate position detection taking such timings into account.

SUMMARY AND OBJECTS OF THE INVENTION

In view of the above demands it is an object of the present invention to provide a vehicle with a position detector capable of transmitting a position detection signal accurately while keeping power consumption low.

For achieving the above-mentioned object, in a vehicle with a position detector, having a communication means which issues information to be used for deciding the position of the vehicle, the present invention permits the electric power for the communication means to be obtained from a main power supply means installed in the vehicle. A control means is provided which maintains the supply of electric power to the communication means for a predetermined time after turning OFF the main power supply means.

The present invention enables the time for maintaining the supply of electric power to the communication means to be set longer than an issuing interval of information to be used for deciding the position of the vehicle.

The present invention provides a communication means that includes a receiver means for detecting a request signal outputted at a predetermined interval from a vehicular position detecting system and a transmitter means which upon receipt of the request signal transmits the information to be used for deciding the position of the vehicle.

The present invention displays the information to be used for deciding the position of the vehicle on a map by the position detecting system.

The present invention provides that the time for maintaining the supply of electric power to the communication means is set longer than an output interval of the request signal.

The present invention provides a housing for removably receiving therein the communication means. The housing is provided with a contact means which fits a terminal provided on the communication means side and which is connected to the main power supply means.

The present invention provides an assist motor means for generating an assisting force to be added to a peddling force. A basket is disposed in a front portion of a vehicle body. The housing is fixed within the basket, and that the main power supply means is a battery used for the assist motor means.

The present invention provides the control means that is disposed on a bottom of the housing. The communication means is disposed on the control means, and that the housing is hermetically sealed with an upper lid.

According to the above features, the supply of electric power to the communication means is maintained for a preset time even after the main power supply means is turned OFF. Until the lapse of the preset time it is possible to issue information to be used for deciding the position of the vehicle. Particularly, according to the features of the present invention, information to be used for deciding the position of the vehicle can be accurately issued until interruption of the supply of electric power to the communication means. The position of the vehicle can be displayed on a map on the position detecting system side on the basis of the information to be used for deciding the position of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
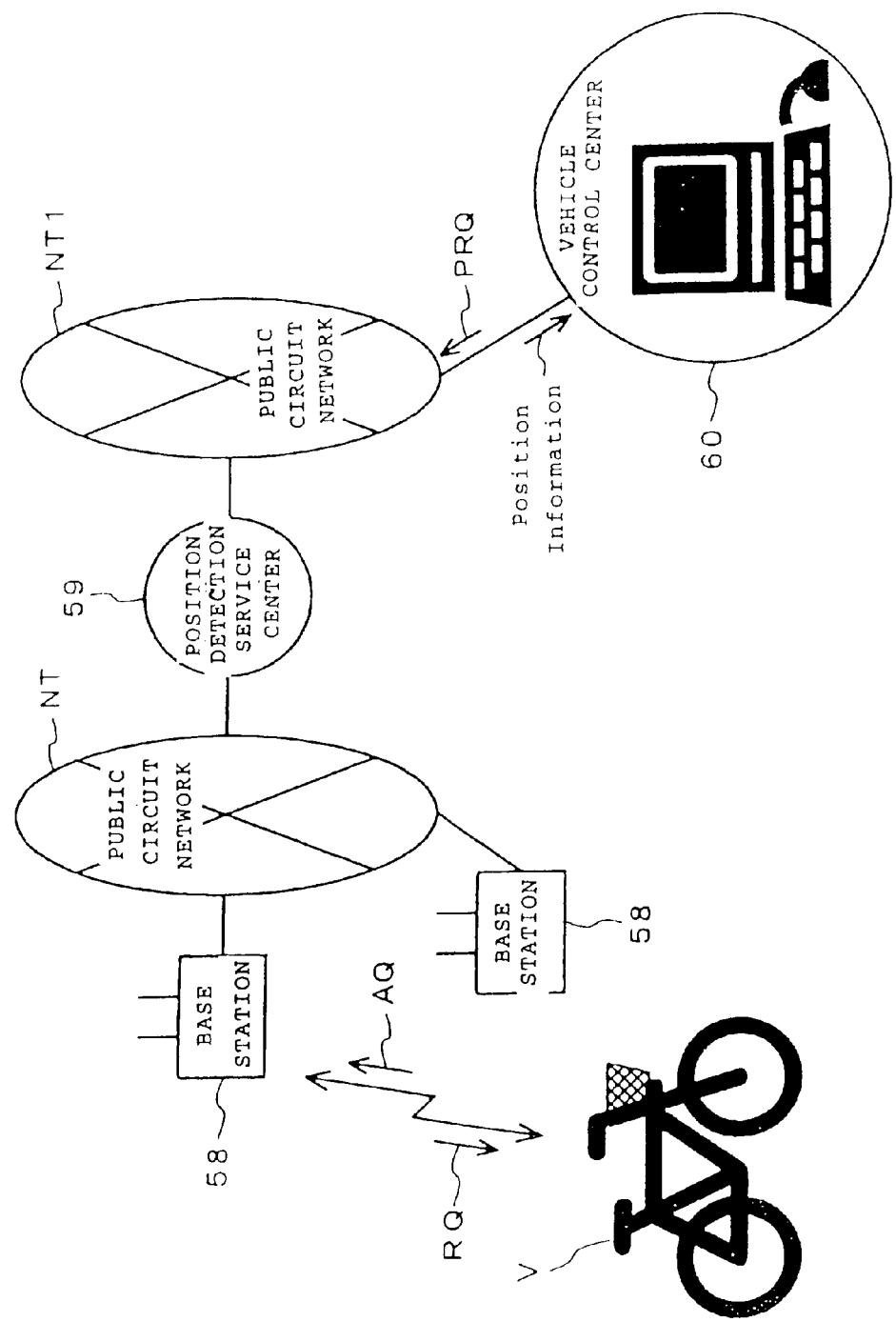
FIG. 1 illustrates the construction of a vehicle control system including a vehicle with a position detector according to the present invention.

The present invention will now be described in detail with reference to the drawings. FIG. 1 illustrates the construction of a vehicle control system which includes a vehicle with a position detector according to an embodiment of the present invention. In FIG. 1, a plurality of base stations 58 are connected to a public circuit network NT. In accordance with instructions provided from a position detection service center 59 as a master station each base station 58 transmits a position information issuance request signal (request) RQ at a predetermined interval T. Upon detection of the request RQ a vehicle V issues an answer signal AQ which includes information (e.g., ID) to be used for deciding the position of the vehicle. The base station 58 which has received the answer signal AQ transfers identification information, which is allocated beforehand to the answer signal AQ-issued vehicle, to the position detection service center 59 through the public circuit network NT. On the basis of the identification information of the vehicle V thus transferred and position information of the base station 58 the position detection service center 59 regards the position of the base station 58 as the position of the vehicle V and registers it.

For improving the position detection accuracy for the vehicle V there can be utilized answer signals AQ to requests RQ issued from plural base stations 58. For example, using answer signals AQ provided back from the vehicle V in reply to requests RQ issued from three base stations 58 whose positions are known, an exact vehicle position can be detected in accordance with the principle of triangulation.

A vehicle control center 60 is connected to another public circuit network NT1, which may be the same as the public circuit network NT. The vehicle control center 60 transmits, together with identification information of the vehicle V, a retrieval request PRQ inquiring of the position detection service center 59 about the position of the vehicle V through the public circuit network NT1. On the basis of the retrieval request PRQ and the identification information the position detection service center 59 transmits the position of the vehicle V to the vehicle control center 60 through the public circuit network NT1.

On the basis of the position information obtained from the position detection service center 59 the vehicle control center 60 can recognize the position of the vehicle V. In this case, the position of the vehicle V may be displayed on a map so that it can be easily recognized visually. Map information for the display may be provided beforehand in the vehicle control center 60 or may be acquired together with position information from the position detection service center 59.

The vehicle control center 60 has a transmitting and receiving function and an image processing function for the transmission of the position information retrieving request PQ, reception of position information, and processing necessary for the display of position information received. These processings can be implemented by using a microcomputer, an image display unit such as CRT or LCD, and a memory for the storage of map information.

The vehicle V is provided with a position detector having a receiving function for receiving requests RQ from the base stations 58 and a transmitting function for transmitting answer signals AQ together with identification information of the vehicle in response to the requests RQ.

Figure 2:
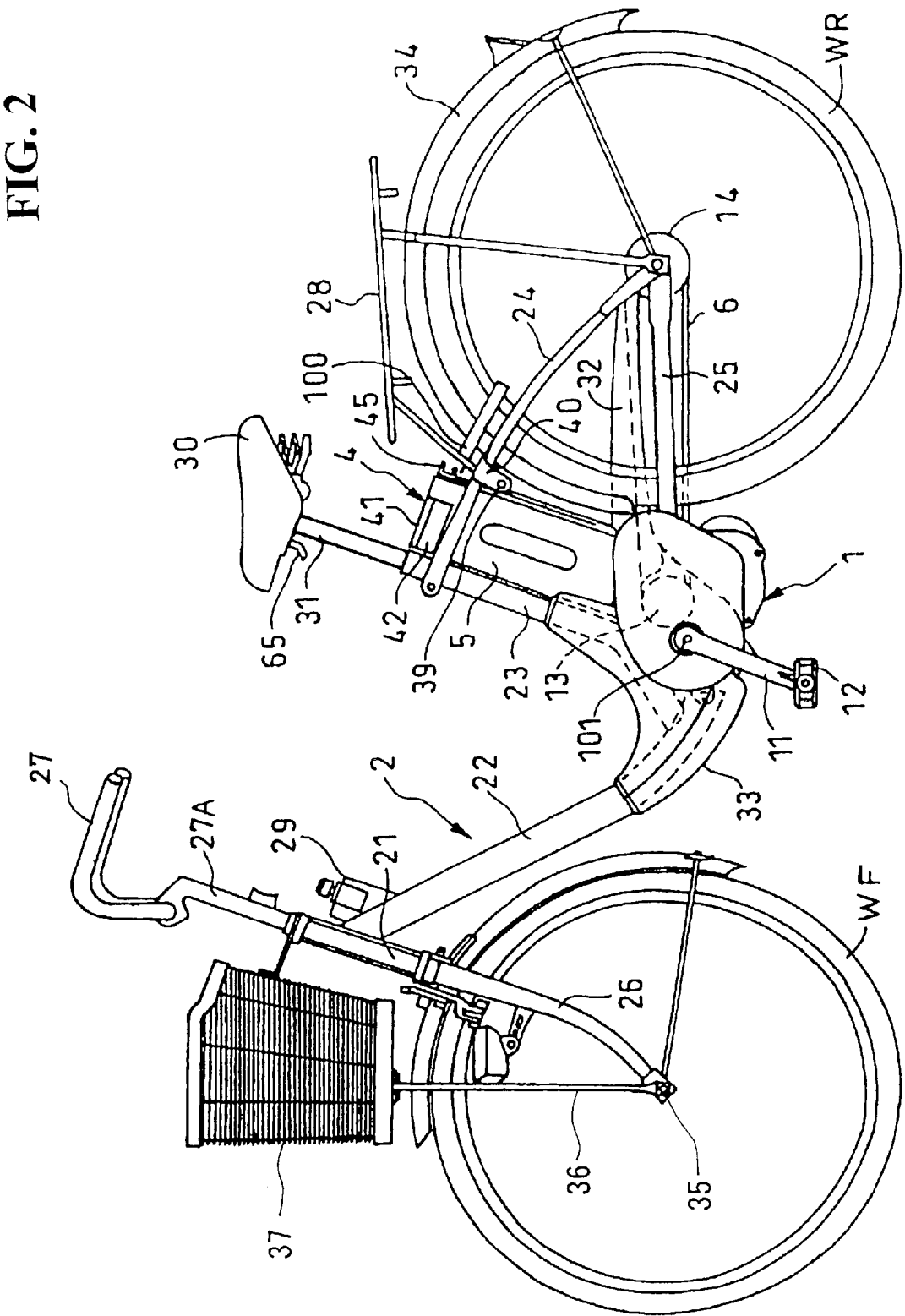
FIG. 2 illustrates an entire construction of a motor-assisted bicycle according to an embodiment of the present invention.

FIG. 2 is a side view of a motor-assisted bicycle as the vehicle V In FIG. 2, a body frame 2 of the motor-assisted bicycle is provided with a head pipe 21 located at a front position of a vehicle body, a down pipe 22 extending downwardly and rearwardly from the head pipe 21, and a seat post 23 rising from near a rear end of the down pipe 22. The connection between the down pipe 22 and the seat post 23 and the vicinity thereof are covered with a resin cover 33 which is vertically divided in two to be removably mounted. A steering handlebar 27 is connected rotatably to an upper portion of the head pipe 21 through a handlebar post 27A, and a front fork 26, which is steered by the steering handlebar 27, is supported steerably by a lower portion of the head pipe 21. A front wheel WF is rotatably supported on an axle at a lower end of the front fork 26.

At a lower portion of the body frame 2 is mounted an assist motor unit 1 which includes an electric motor M for assisting a manual peddling force. A power switch 29 for the assist motor unit 1 is disposed on the down pipe 22 at a position close to the head pipe 21 so as to be turned ON and OFF with a power key. The power switch 29 may be disposed on the handlebar 27 in front of the pipe, or on the handlebar post 27A.

The assist motor unit 1 is connected with screws to and suspended from three connections (not shown) which are respectively positioned at the rear end of the down pipe 22, near a lower end of the seat post 23, and on chain stays 25.

A crank shaft 101 is rotatably supported in the assist motor unit 1 and pedals 12 are secured respectively to both right and left ends of the crank shaft 101 through cranks 11. The chain stays 25, which are provided in a pair right and left, extend rearwardly from the assist motor unit 1 and a rear wheel WR as a driving wheel is supported between rear ends of the chain stays 25 through an axle. A driving sprocket 13 is connected to the crank shaft 101. The driving sprocket 13 and a rear sprocket 14 secured to the rear wheel WR are interconnected through a chain 6. The whole of the driving sprocket 13 and an upper half of the chain 6 are covered with a chain cover 32.

A pair of right and left rear upper arms 24 are disposed between an upper portion of the seat post 23 and the rear ends of both chain stays 25. A seat pipe 31 with a seat 30 mounted on an upper end thereof is fitted in the seat post 23 so as to be vertically slidable within the seat post 23, thus permitting adjustment of the height of the seat 30. At a front position of the vehicle body is provided a basket 37 for goods. The basket 37 is supported by stays 36 extending upwardly from an axle 35 of the front wheel WF and also by the handlebar post 27A.

A battery 4 contained in a receptacle case 5, which is generally in the shape of rectangular parallelepiped, is installed behind the seat post 23. The battery 4 includes a plurality of battery cells and is installed along the seat post 23 so that its longitudinal direction is approximately a vertical direction. A knob 41 is provided at an upper end in the longitudinal direction of the battery 4. A residual charge quantity meter 42 for indicating a residual charge quantity is provided on an upper surface of the battery 4 with the knob 41 mounted thereon. Behind the battery 4 an operating lever 45 for locking and unlocking the battery 4 and a wheel locking device 100 are installed.

An upper portion of the receptacle case 5 is fixed with screw 39 to a bracket 40 which is fixed to each rear upper arm 24 by welding for example. The wheel locking device 100 and a rear fender 34 are also fixed with screws to the bracket 40.

A lower end of the receptacle case 5 is screwed to a bracket (not shown) extending rearwardly from the seat post 23. Moreover, a reinforcing bracket (not shown) which covers side portions of a lower end of the battery 4 is provided to prevent an external force from being exerted directly on the battery 4 through the receptacle case 5.

In the assist motor unit 1, a peddling force inputted from the crank shaft 101 and an electric assist power generated by a motor M are transmitted to the rear wheel WR via the driving sprocket 13 and the chain 6.

Figure 3:
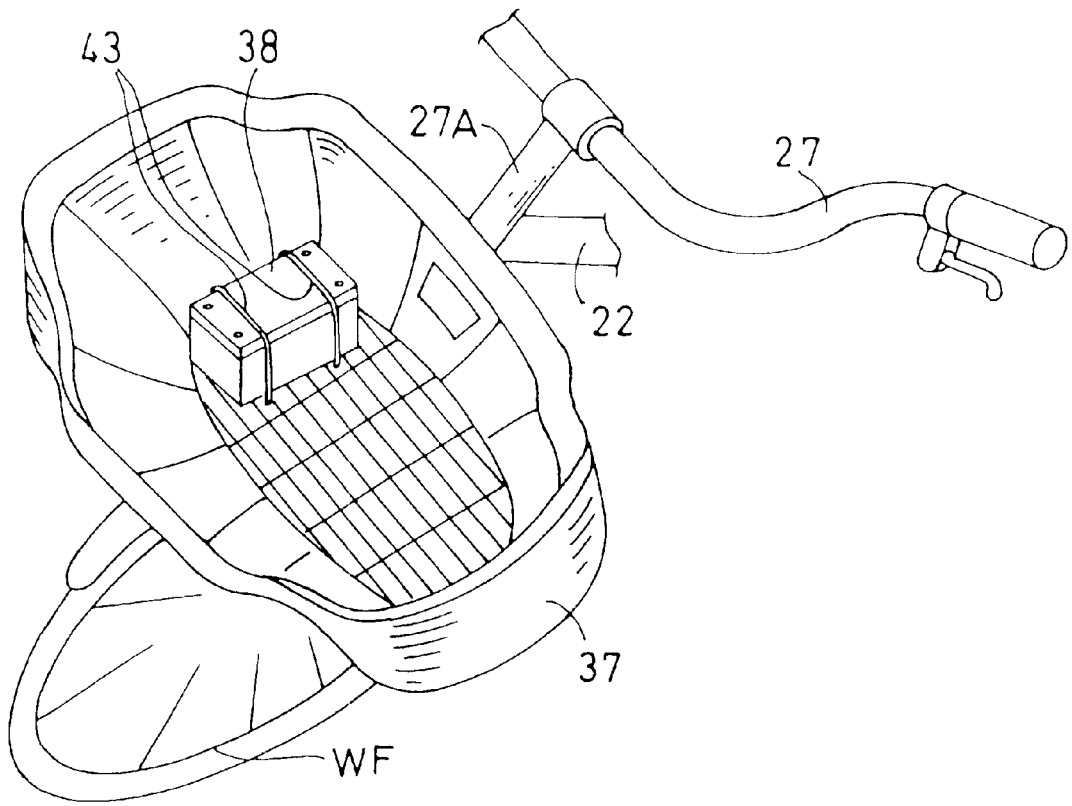
FIG. 3 is a perspective view of a basket for goods as seen from above.

FIG. 3 is a perspective view of the goods basket 37 as seen from above. In FIG. 3, a position detector 38 is installed at a right corner position on an inside bottom surface of the basket 37. Thus, since the installed position of the position detector 38 is relatively high, there can be attained a satisfactory transmission/reception performance and the position detector 38 is difficult to undergo vibration and shock from the road surface, so that a high durability is ensured and maintenance and inspection are easy. The position detector 38 is bound to the basket 37 with use of a band 43, or any other suitable fixing means, e.g. screws may be adopted.

Figure 4:
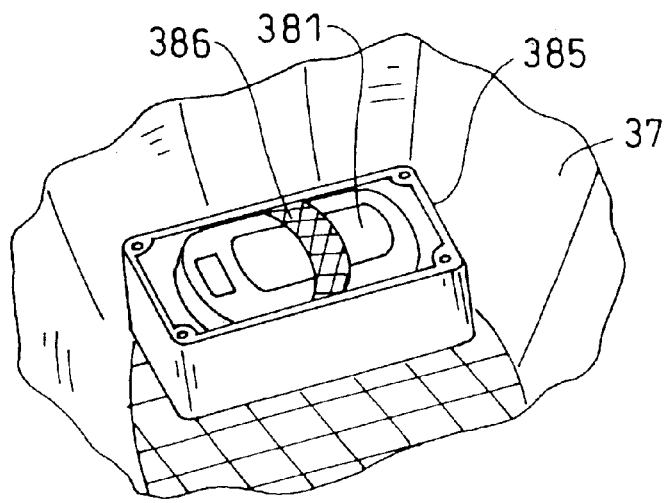
FIG. 4 is a partially exploded, enlarged view of a principal portion in FIG. 3.

FIG. 4 is a partially exploded, enlarged view of a principal portion of FIG. 3, with a lid, to be described later, of the position detector 38 being removed. A body 381 of the position detector 38 is bound together with a back lid and a control substrate, to be described later, with use of an elastic band 386 such as a cloth or rubber band and is fixed within a box 385.

Figure 5:
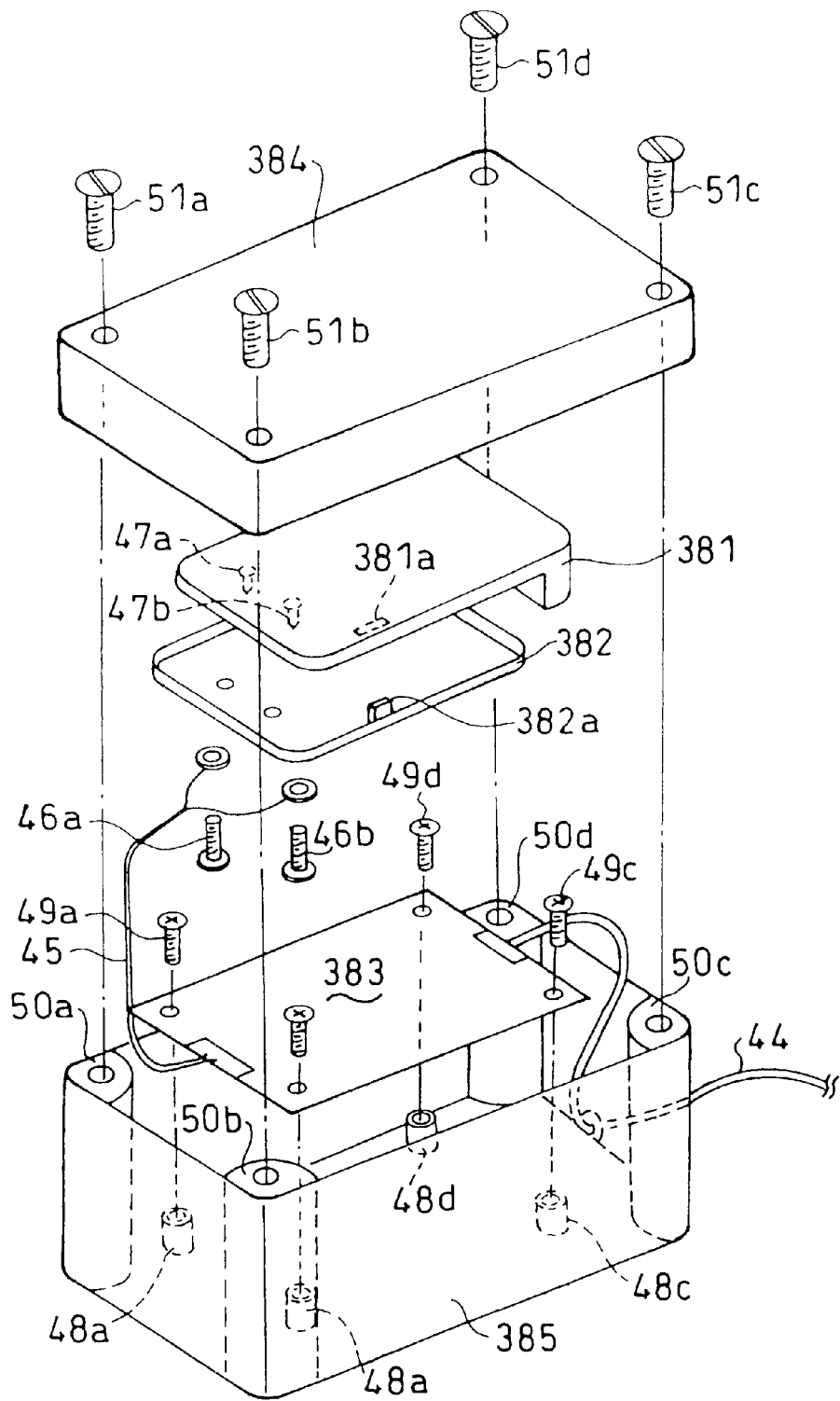
FIG. 5 is an exploded perspective view of the position detector.
Figure 6:
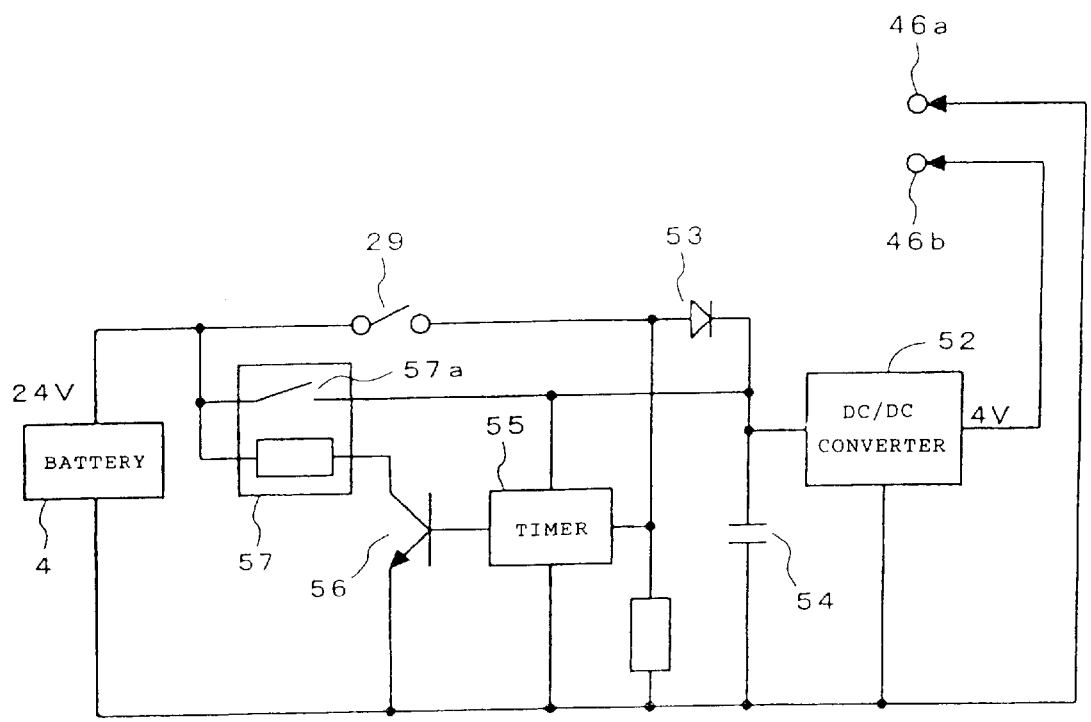
FIG. 6 is a circuit diagram of a control unit which supplies electric power to the position detector.

FIG. 5 is an exploded perspective view of the position detector 38. In FIG. 5, the position detector 38 includes a receiving function for receiving a request RQ from each base station 58 and a transmitting function for transmitting an answer signal AQ together with identification information of the vehicle in reply to the request RQ. The position detector 38 comprises a body 381, a body back lid 382, and a control board 383 with a power control circuit (see FIG. 6) mounted on the back side thereof, all of which are accommodated within the box 385 equipped with a lid 384. A power cord 44 extended from the battery 4 is drawn into the box 385 and is connected to the control board 383. On the other hand, a cord 45 drawn out from a DC—DC converter on the control board 383 which converter will be described later is connected to the body back lid 382 with screws 46a and 46b. The screws 46a and 46b are inserted through the body back lid 382 from the back side to the body 381 side. In this case, positioning is made so that the tips of the screws 46a and 46b come into abutment against power input pins 47a and 47b on the body 381 when the body 381 and the body back lid 382 are assembled together. The screws 46a and 46b constitute contact means for the supply of electric power to the position detector 38.

The control board 383 is fixed with four screws 49a to 49d which are threadedly engaged with bosses 48a to 48d formed on the bottom of the box 385. The case lid 384 is fixed to the box 385 with four screws 51a to 51d which are threadedly engaged with bosses 50a to 50d formed at four corners of the box 385. Pawls 382a are formed on the lid 382. When the lid 382 is combined with the body 381, the pawls 382a come into engagement with holes 381a formed in the body 381. The pawls 382a and the holes 381a are formed at a plurality of positions. It is preferable that the power cord 44 and the cord 45 are each connected to the control board 383 using a connector of a detachable type.

A description will now be given of a power supply circuit mounted on the control board 383. In a circuit diagram illustrated in FIG. 6, a main switch 29 is used also as the switch of the assist motor unit 1. A DC—DC converter 52 converts the voltage (24 volts) of the battery 4, which is inputted through the main switch 29 and the diode 53, to a value (4 volts) matching the supply voltage of the position detector 38 and outputs the thus-regulated voltage. The voltage thus regulated to 4 volts is applied as a supply voltage to the position detector 38 through the contacts 46a and 46b which are connected to the cord 45.

A capacitor 54 is charged while the main switch 29 is ON. Upon turning OFF of the main switch 29, the charge voltage of the capacitor 54 is applied to a timer 55, which turns ON for a preset time to be described later. While the timer 55 is ON, a transistor 56 turns ON and a relay 57 is energized. As a result, a contact 57a of the relay 57 closes to maintain the input voltage to the DC—DC converter 52. Upon turning OFF of the timer 55, the transistor is deenergized and the contact 57a opens to cut off the input to the DC—DC converter 52. Thus, even after turning OFF of the main switch 29, the supply of electric power to the position detector 38 is maintained.

For example, it is preferable that the time set for the timer 55 is decided in the following manner. For a request interval T from the base stations 58, the time set for the timer 55 is assumed to be T1 (T<T1). By making such a decision, a reply can be made accurately once to a request issued from a base station 58 while the supply of electric power is continued by the timer 55. As a result, when the main switch 29 is turned OFF, it is possible to communicate the position at which the operation of the motor-assisted bicycle is stopped or at least a position in the vicinity thereof. For example, if the request interval T is 15 minutes, the value T1 set for the timer 55 is set to 20 minutes.

In the above embodiment the vehicle control center 60 searches for the position of the vehicle V through the position detection service center 59. That is, a control system is constituted by the base stations 58, the position detection service center 59, and the vehicle control center 60. However, a control system may be constituted in such a manner that the vehicle control center 60 is allowed to possess the function of the position detection service center 59, a base station 58 is instructed to output a request RQ directly from the control center 60, and the control center 60 receives an answer signal AQ directly from the base station 58. Although in FIG. 1, the public circuit network NT to which the base stations 58 are connected and the public circuit network NT1 to which the vehicle control center 60 is connected are separate networks, the base stations 58, the vehicle control center 60, and the position detection service center 59 may be connected to a single public circuit network. The present invention is widely applicable not only to motor-assisted vehicles but also to vehicles with a power supply such as a battery mounted thereon, e.g., electric vehicles.

As will be apparent from the above description, according to the present invention, information to be used for deciding the position of the vehicle can be issued for a certain period of time even after turning OFF the main power supply means, so at a vehicular stop position it is possible to issue the said information let the control system recognize the position of the vehicle. In the control system, therefore, the position of the vehicle can be recognized accurately even after the main power supply means is turned OFF, whereby the maintenance of the vehicle and accounting can be effected efficiently.

Particularly, according to the present invention, information to be used for deciding the position of the vehicle can be accurately issued at least once even after the main power supply means is turned OFF.

According to the present invention, since the communication means is detachably attached to the vehicle, it is possible to facilitate the maintenance. Further, according to the present invention, in a small-sized vehicle such as a bicycle wherein it is easy to ensure a receptacle space, the communication means and the control means can be installed easily without requiring any special space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle with a position detector comprising:
    a communication means for issuing information to be used for deciding the position of the vehicle;
    a main power supply means installed in the vehicle for supplying electric power for said communication means; and
    a control means for maintaining the supply of electric power to said communication means for a predetermined time after turning OFF said main power supply means, wherein the time for maintaining the supply of electric power to said communication means is set to be longer than an issuing interval of information to be used for deciding the position of the vehicle.

2. The vehicle with a position detector according to claim 1, wherein said communication means includes a receiver means for detecting a request signal outputted at a predetermined interval from a vehicular position detecting system and a transmitter means which upon receipt of said request signal transmits said information to be used for deciding the position of the vehicle.

3. The vehicle with a position detector according to claim 2, wherein said information to be used for deciding the position of the vehicle permits the position to be displayed on a map by said position detecting system.

4. The vehicle with a position detector according to claim 1, having a housing for removably receiving therein said communication means, said housing being provided with a contact means which fits a terminal provided on said communication means side and which is connected to said main power supply means.

5. The vehicle with a position detector according to claim 4, having an assist motor means for generating an assisting force to be added to a peddling force and a basket disposed in a front portion of a vehicle body, and wherein said housing is fixed within said basket, and said main power supply means is a battery used for said assist motor means.

6. The vehicle with a position detector according to claim 4, wherein said control means is disposed on a bottom of said housing, said communication means is disposed on said control means, and said housing is hermetically sealed with an upper lid.

7. A position detector for a vehicle comprising:
    a communication means for issuing a signal to be used for detecting a position of a vehicle;
    a main power supply means for supplying electric power to said communication means; and
    a control means operatively connected to said main power supply means for maintaining the supply of electric power to said communication means for a predetermined time after turning OFF said main power supply means, wherein the time for maintaining the supply of electric power to said communication means is set to be longer than an issuing interval of information to be used for determining the position of the vehicle.

8. The vehicle with a position detector according to claim 7, wherein said communication means includes a receiver means for detecting a request signal outputted at a predetermined interval from a vehicular position detecting system and a transmitter means which upon receipt of said request signal transmits said information to be used for determining the position of the vehicle.

9. The vehicle with a position detector according to claim 8, wherein said information to be used for detecting the position of the vehicle permits the position to be displayed on a map by said position detecting system.

10. The vehicle with a position detector according to claim 7, having a housing for removably receiving therein said communication means, said housing being provided with a contact means which fits a terminal provided on said communication means side and which is connected to said main power supply means.

11. The vehicle with a position detector according to claim 10, having an assist motor means for generating an assisting force to be added to a peddling force and a basket disposed in a front portion of a vehicle body, and wherein said housing is fixed within said basket, and said main power supply means is a battery used for said assist motor means.

12. The vehicle with a position detector according to claim 10, wherein said control means is disposed on a bottom of said housing, said communication means is disposed on said control means, and said housing is hermetically sealed with an upper lid.

* * * * *